US008150730B2

(12) United States Patent
Oh et al.

(10) Patent No.: US 8,150,730 B2
(45) Date of Patent: Apr. 3, 2012

(54) METHOD AND APPARATUS FOR INTERNET SALE USING SALE CONTENTS

(75) Inventors: Byeong Thaek Oh, Daejeon (KR); Kwang Roh Park, Daejeon (KR); Ho Jin Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1140 days.

(21) Appl. No.: 11/952,231

(22) Filed: Dec. 7, 2007

(65) Prior Publication Data

US 2008/0140533 A1 Jun. 12, 2008

(30) Foreign Application Priority Data

Dec. 8, 2006 (KR) .................. 10-2006-0124800

(51) Int. Cl.
*G06Q 30/00* (2012.01)
(52) U.S. Cl. .................... 705/14.4; 705/26.1
(58) Field of Classification Search ............ 705/14.4, 705/26.1
See application file for complete search history.

(56) References Cited

U.S. PATENT DOCUMENTS

| 6,125,353 A * | 9/2000 | Yagasaki ............... 705/26.62 |
| 7,010,534 B2 * | 3/2006 | Kraft ...................... 705/26.8 |
| 7,072,860 B2 * | 7/2006 | Kakuta .................... 705/80 |
| 2005/0055281 A1 * | 3/2005 | Williams .................. 705/26 |
| 2005/0177387 A1 * | 8/2005 | Mojsa ...................... 705/1 |
| 2006/0080432 A1 | 4/2006 | Spataro et al. |
| 2008/0033781 A1 * | 2/2008 | Peretti .................... 705/10 |

FOREIGN PATENT DOCUMENTS

| JP | 2005-182228 | 7/2005 |
| JP | 2006048511 | 2/2006 |
| KR | 1020040029337 | 4/2004 |
| KR | 1020060086658 | 1/2006 |
| KR | 1020060031471 | 4/2006 |
| KR | 1020060082346 | 7/2006 |
| WO | WO 2006/051398 | 5/2006 |

OTHER PUBLICATIONS

KIPO Notice of Office Action mailed Jan. 31, 2008 for the corresponding application KR10-2006-0124800.

* cited by examiner

*Primary Examiner* — Eric T Wong
(74) *Attorney, Agent, or Firm* — Ladas & Parry LLP

(57) ABSTRACT

There is provided a method of selling in a shopping mall server. The method includes: displaying at least one sale content as sale information of a product selected to be sold; displaying a interested sale content selected by consumer among the sale contents; performing a payment transaction via a payment system when the selected product is determined to be purchased.

17 Claims, 13 Drawing Sheets

⋮

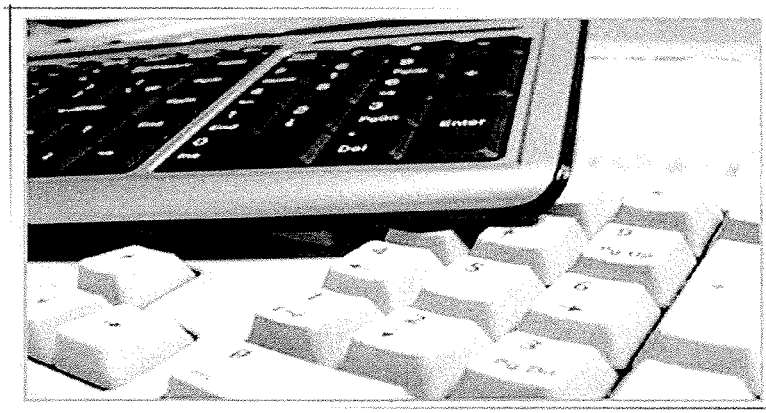

There is a great difference in heights. Remembering when I continuously moved my fingers while typing makes me very happy now

Due to a soft key touch in a pantograph type, though typing in a long time, there is less fatigue.

Conclusion
I think this product allows a user to feel full conveniences by including only convenient functions. Different from others with showy colors, corners and a front are curved and grey is mixed with black as a whole. Therefore, this keyboard is not boring and can be easily used for a long time. This has a lot of merits to be loved

[SAMSUNG CORP. PLEOMAX Keyboard PKB-5000]
[INTERPARK: 20,000 won]
[GSE-SHOP: 21,000 won]

METHOD AND APPARATUS FOR INTERNET SALE USING SALE CONTENTS

CROSS-REFERENCE TO RELATED APPLICATIONS

This application claims the priority of Korean Patent Application No. 10-2006-0124800 filed on Dec. 8, 2006, in the Korean Intellectual Property Office, the disclosure of which is incorporated herein by reference.

This work was supported by the IT R&D program of MIC/IITA[2006-S068-01, Development of Virtual Home Platform based on Peer-to-Peer Networking].

BACKGROUND OF THE INVENTION

1. Field of the Invention

The present invention relates to an Internet sale method, and more particularly, to an Internet sale method and apparatus using sale content, in which an Internet shopping mall uses a product review written in a personal homepage as sale information.

2. Description of the Related Art

In general, when a product is posted on an Internet shopping mall, consumers may read a brief description or optional extras of a product, may buy the product via a payment system, and may write a brief product review with respect to the product in the shopping mall server.

Accordingly, it is difficult to access a detailed description for the product or various opinions of consumers previously buying the product, via the description for the product or the product review posted on the shopping mall server.

Also, in general shopping mall servers, a right of a shopping mall server seller is definitely distinguished from a right of a consumer and a general consumer is not allowed to sell a product. Accordingly, a consumer wants to be a seller, the consumer administrate own shopping mall or has to be approved of a right of seller by shopping mall servers.

On the other hand, currently, consumers not only are satisfied with simply buying a product but also writes detailed product information and a product review with respect to a product that consumers buy in personal blogs, mini-homepages, and homepages of cafes and clubs (hereinafter, referred to as "personal homepage") in public.

However, a content written in a personal homepage as described above may not be accepted nor be protected as a content and may not create additional profits with respect to an effort.

SUMMARY OF THE INVENTION

An aspect of the present invention provides an Internet shopping mall and a method of service using P2P technologies and personal homepages, in which a content written on a personal homepage is accepted as content, thereby generating profits with respect to the content.

According to an aspect of the present invention, there is provided a method of registering sale content of a shopping mall server, the method including: collecting and analyzing product code advertisements and obtaining and storing a product code for each product; writing a product review with respect to one of the product codes in a personal homepage; and publishing a sale content advertisement with respect to the product review to a P2P network.

According to an aspect of the present invention, there is provided a method of registering sale content of a shopping mall server, the method including: obtaining a product code of a product for sale; periodically collecting and analyzing sale content advertisements corresponding to the product by searching A P2P network and obtaining sale contents including a product review of the product; and inserting the sale contents as sale information in a product sale page for selling the product.

According to another aspect of the present invention, there is provided a method of registering sale content of a shopping mall server, the method including: registering a product for sale, in sale content administration server and receiving a product code of the product; accessing the sale content administration server via Internet networks to obtain sale contents provide by the sale content administration server; and inserting the sale contents as sale information in a product review page for selling the product.

According to an aspect of the present invention, there is provided a method of providing sale content of sale content administration server, the method including: issuing a product code of a product according to a request of at least one shopping mall server and publishing a product code advertisement including the product code; collecting and analyzing sale content advertisements and obtaining and storing sale contents corresponding to the product code; and obtaining and providing the sale contents corresponding to the product code according to a request of the shopping mall server.

According to an aspect of the present invention, there is provided a method of selling in a shopping mall server, the method including: displaying at least one sale content as sale information of a product selected to be sold; displaying a interested sale content selected by consumer among the sale contents; performing a payment transaction via a payment system when the selected product is determined to be purchased.

According to an aspect of the present invention, there is provided a method of shopping using a P2P application, the method including: collecting and analyzing product code advertisements to display a list of advertised products; collecting sale content advertisements with respect to a product when the product is selected from the list of advertised products; obtaining and displaying product reviews, uniform resource locators of product sale pages, and prices information, corresponding to the product by analyzing the collected sale content advertisement and price advertisements; and moving to a product review page having a uniform resource locator when the uniform resource locator is selected from the uniform resource locators.

According to another aspect of the present invention, there is provided a shopping mall server including: a P2P application part publishing a product code advertisement of a product for sale, in A P2P network and obtaining sale contents by collecting and analyzing sale content advertisements corresponding to the product; and a shopping mall administration part administering an Internet shopping mall for selling the product and using the sale contents obtained by the P2P application part as sale information of the product.

According to another aspect of the present invention, there is provided a user terminal including: a personal homepage administration part writing and registering the product review for a product code advertisement published by shopping mall server in the personal homepage as a sale content; and a P2P application part publishing a sale content advertisement with respect to the sale content.

According to another aspect of the present invention, there is provided sale content administration server including: a product code administration part issuing a product code of a product according to a request of at least one shopping mall server and publishing product code advertisements including the product code; sale content administration part collecting and analyzing sale content advertisement by searching a P2P network and obtaining and storing sale content corresponding to the product code; sale content providing part obtaining and providing the sale content corresponding to the product code according to the request of the shopping mall server; a P2P communication part interfacing data transmitted and received between the sale content administration part and the P2P network; and an Internet communication part interfacing data transmitted and received between the sale content providing part and the shopping mall server.

BRIEF DESCRIPTION OF THE DRAWINGS

The above and other aspects, features and other advantages of the present invention will be more clearly understood from the following detailed description taken in conjunction with the accompanying drawings, in which:

FIG. 11 is a diagram illustrating a product review of a personal homepage and price information of a shopping mall server, according to an exemplary embodiment of the present invention.

DETAILED DESCRIPTION OF THE PREFERRED EMBODIMENT

Figure 1:
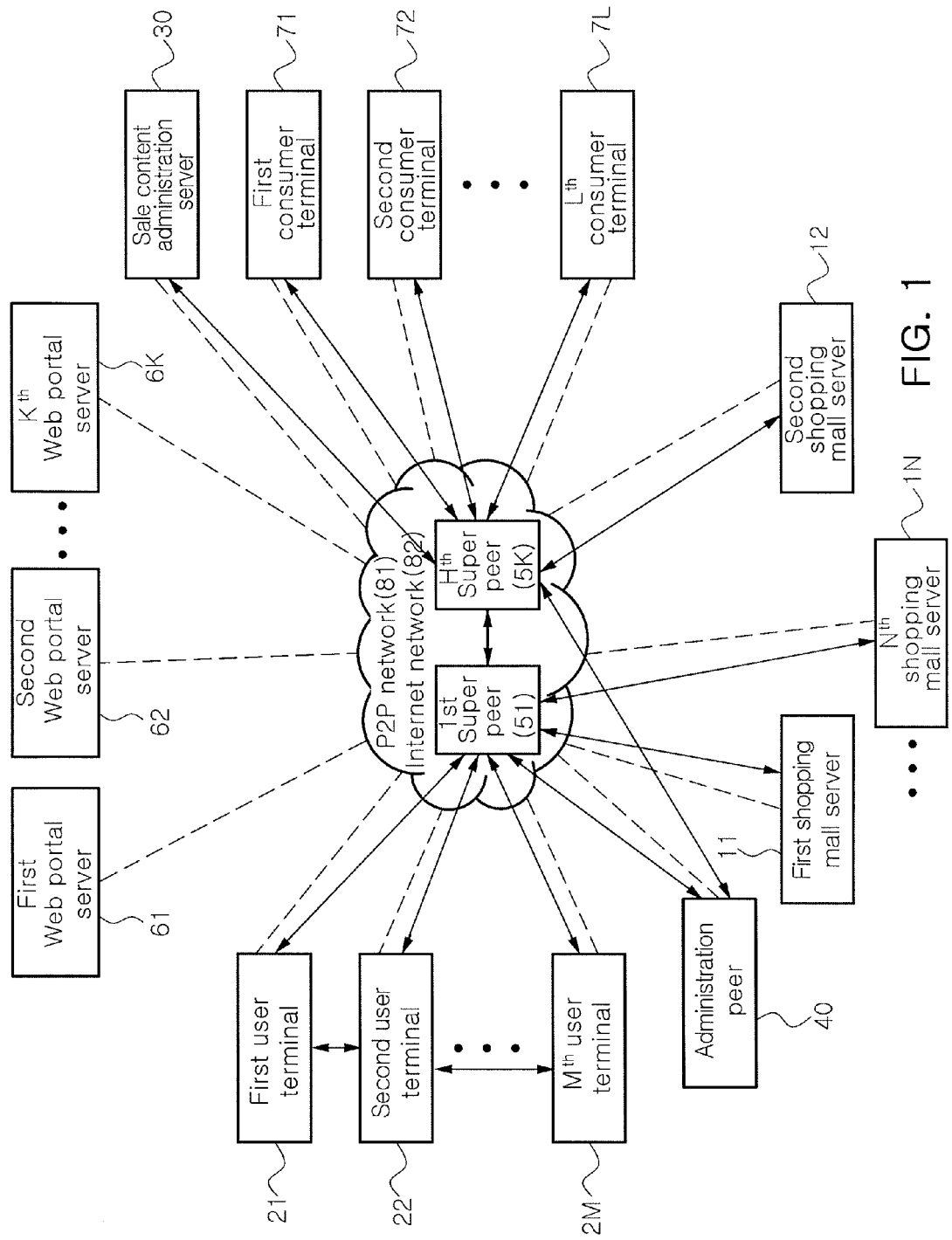
FIG. 1 is a block diagram illustrating a P2P shopping system using a personal homepage, according to an exemplary embodiment of the present invention.

Exemplary embodiments of the present invention will now be described in detail with reference to the accompanying drawings. Only, In describing operations according to an exemplary embodiment of the present invention in detail, when a detailed description for well-known related functions and configurations is determined to be capable of making the substance of the present invention be unclear, the detailed description will be omitted.

Also, over the drawings, a part having a similar function and similarly operating will be received an identical reference numeral.

FIG. 1 is a block diagram illustrating a P2P shopping system using a personal homepage, according to an exemplary embodiment of the present invention.

As shown in FIG. 1, the P2P shopping system includes a plurality of shopping mall servers 11 to 1N, a plurality of user terminals 21 to 2M, a sale content administration server 30, an administration peer 40, super peers 51 to 5K, a plurality of web portal servers 61 to 6K, a plurality of consumer terminals 71 to 7L, a P2P network 81, and an Internet network 82.

In this case, there are the shopping mall servers 11 to 1N, the user terminals 21 to 2M, the sale content administration server 30, the administration peer 40, and the super peers 51 to 5K, as a terminal performing P2P communication.

Hereinafter, "advertisements" indicates advertisements for resources in the P2P communication network.

Each of the plurality of shopping mall servers 11 to 1N administrates an Internet shopping mall, publishes product code advertisements for a product for sale directly or via the sale content administration server 30, obtains sale content by collecting and analyzing sale content advertisement, and uses the sale content as sale information of a corresponding product.

In this case, the sale content includes a product code, writer information, a uniform resource locator (URL) of a product review page, and a product review.

In this case, a uniform resource locator (URL) means the location of web based content and P2P based content.

Namely, as the sale information of a product in an Internet shopping mall, one of a product review written in a personal homepage, and a URL of a product review page of a personal homepage including the product review is added in addition to product description, price, and product reviews written by consumers accessing Internet network.

Here, the product review could be configured as various forms such as text, photograph and a user created movie clip.

Therefore, consumers may read the product review written as the sale content for corresponding product or move to the product review page of the personal homepage in order to read the product review of corresponding product, thereby obtaining more detailed product information.

Each of the plurality of user terminals 21 to 2M access a personal homepage provided by the web portal servers 61 to 6K, make a product review page including a product review of a certain product, and then publish a sale content advertisement with respect to the product review page on the P2P network 81.

Also, the plurality of user terminals 21 to 2M collect, analyze, and display product code advertisements, sale content advertisements, and price advertisements, thereby supporting users to buy the product by using them.

Some user terminals may perform only an operation of publishing the sale content advertisement or only an operation of shopping using a P2P application.

The sale content administration server 30 issues a product code and generates and publishes product code advertisements with respect to the product code on the P2P network 81, when each of the shopping mall servers 11 to 1N registers a new product. Also, the sale content administration server 30 obtains sale content for each product by collecting and analyzing sale content advertisement published by the plurality of user terminals 21 to 2M and provides sale content with respect to a product when a certain shopping mall server requests the sale content.

The administration peer 40 includes a P2P application to provide to the plurality of user terminals 21 to 2N. When the plurality of user terminals 21 to 2N drive the P2P application, the administration peer 40 performs a user authentication operation. When the user authentication operation is successively performed and the P2P application is activated, information is shared among the plurality of user terminals 21 to 2M.

The super peers 51 to 5K connect all of the plurality of user terminals 21 to 2N and servers 11 to 1N, 30, 40, and consumer terminals 71 to 7L with each other and interfaces messages transmitted and received therebetween, thereby forming a P2P network, and managed by the system operator.

The web portal servers 61 to 6K support various personal homepages such as mini-homepages, cafes, and club home pages to be open and administrated. For example, as the web portal servers 61 to 6K, there are, yahoo, msn and google.

The plurality of consumer terminals 71 to 7L access a desired shopping mall server 11 via the Internet network 70, select an interested product, read sale information of the interested product, and buy the product.

The P2P network 81 connects servers and terminals communicating with each other P2P, and the Internet network 82 connects servers and terminals communicating with each other client to server. Accordingly, the plurality of shopping mall servers 11 to 1N, the plurality of user terminals 21 to 2M, the sale content administration server 30, the administration peer 40, the super peers 51 to 5K and the plurality of consumer terminals 71 to 7L are connected to each other via the P2P network 81. The plurality of user terminals 21 to 2M are connected to the plurality of web portal servers 61 to 6K and the plurality of shopping mall servers 11 to 1N, the sale content administration server 30, and the plurality of consumer terminals 71 to 7L are connected to each other via the Internet network 82.

Figure 2:
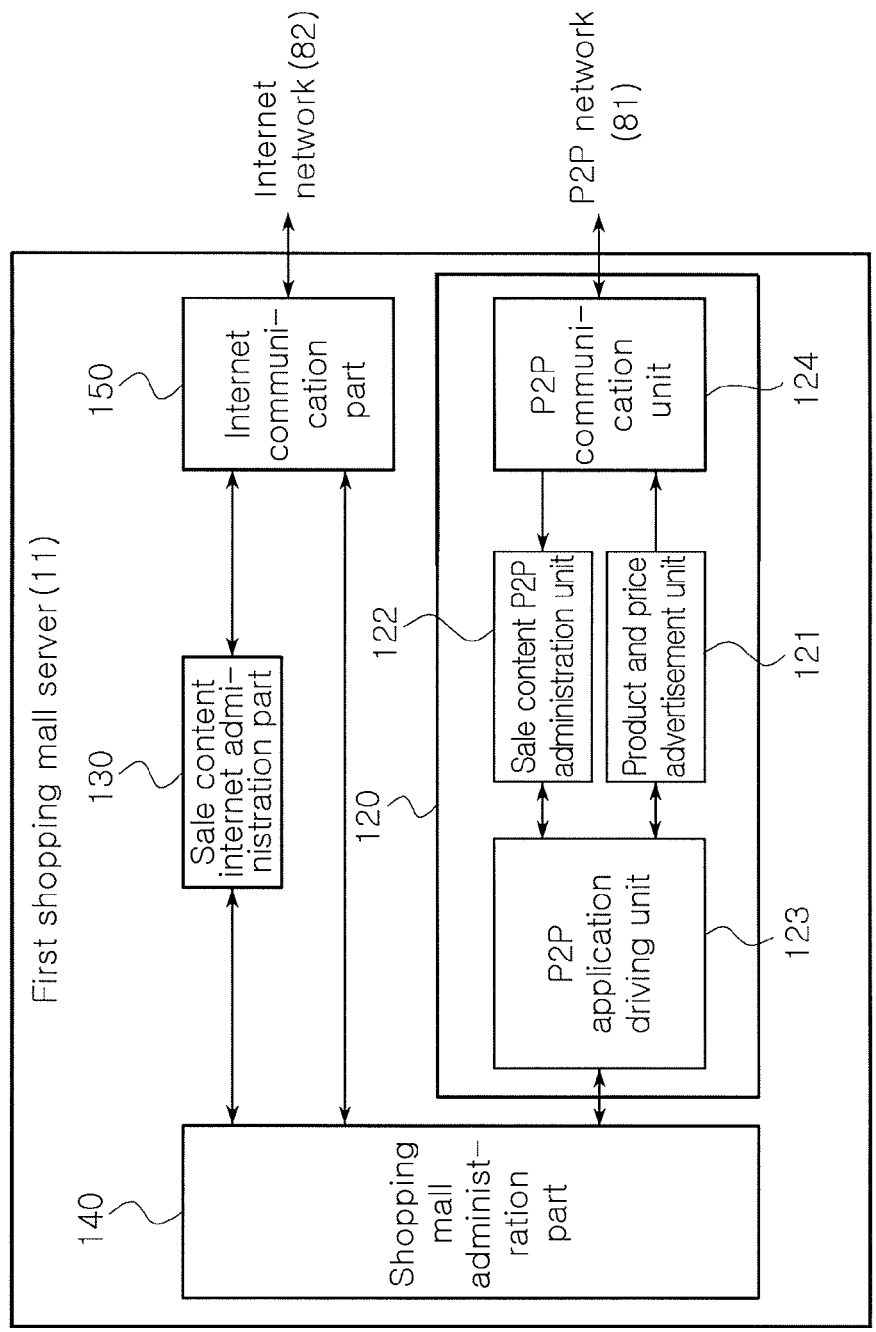
FIG. 2 is a detailed configuration diagram illustrating a first shopping mall server according to an exemplary embodiment of the present invention.

FIG. 2 is a detailed configuration diagram illustrating the first shopping mall server 11 according to an exemplary embodiment of the present invention.

As shown in FIG. 2, the first shopping mall server 11 includes a P2P application part 120, sale content Internet administration part 130, a shopping mall administration part 140, and an Internet communication part 150. The P2P application part 120 includes a product and price advertisement unit 121, sale content P2P administration unit 122, a P2P application driving unit 123, and a P2P communication unit 124.

The product and price advertisement unit 121 generates and publishes one of product code advertisements for a certain product and price advertisements for certain sale content on the P2P network 81 under the control of the P2P application driving unit 123. In this case, the product code advertisements include product code information of a corresponding product and the price advertisements include a URL and price information of a product sale page using the certain sale content as sale information.

The sale content P2P administration unit 122 collects and analyzes sale content advertisements for a certain product, extracts sale content including a product code, writer information, a URL of a product review page, and a product review and classifies the sale content for each product, under the control of the P2P application driving unit 123.

The P2P application driving unit 123 installs a P2P application to allow an administrator of the shopping mall server 11 to request an advertisement operation of a certain product, to search sale contents for the certain product, selects one of a URL of a product review page and a product review used for sale information, and request price advertisements for a certain sale content.

The P2P communication unit 124 interfaces all messages and data transmitted and received between the P2P application part 120 and the P2P network 81.

When the shopping mall server 11 requests sale content for a certain product on the P2P network 81 directly, the sale content P2P administration unit 122 allows to search and collect and analyze sale content advertisements for a certain product through the P2P network 81.

The sale content Internet administration part 130 accesses the sale content administration server 30 connected to the Internet network 82 and receives and stores sale contents for a certain product, under the control of the shopping mall administration part 140.

The shopping mall administration part 140 includes a webpage of an Internet shopping mall, in which one of a URL of a product review page and a product review included in sale content is used for sale information of the product in addition to a product description for the product and price information, and controls general administration of the webpage.

Also, the shopping mall administration part 140 determines whether to execute a point system for each sale content, provides a sale margin to a writer of sale content corresponding to the point system by considering sales of a product and points given by consumers, and provides a certain sale margin a writer regardless of points. Namely, sale content writer is allowed to receive a profit with respect to the sale content.

Internet communication part 150 interfaces messages and data transmitted and received between the shopping mall administration part 140, the sale content Internet administration part 130, and the Internet network 82.

Figure 3:
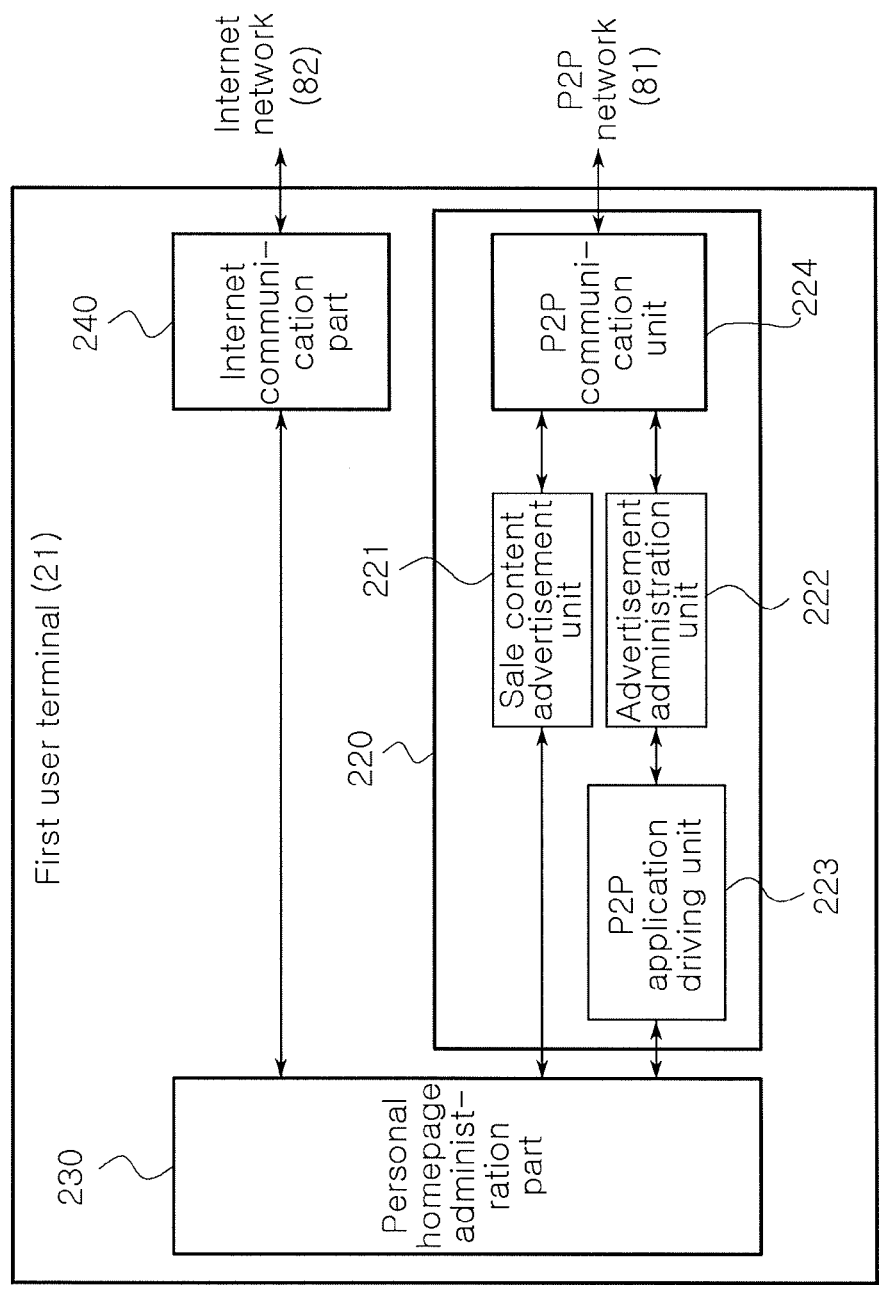
FIG. 3 is a detailed configuration diagram illustrating a first user terminal according to an exemplary embodiment of the present invention.

FIG. 3 is a detailed configuration diagram illustrating a first user terminal 21 according to an exemplary embodiment of the present invention.

As shown in FIG. 3, the first user terminal 21 includes a P2P application part 220, a personal homepage administration part 230, and an Internet communication part 240. The P2P application part 220 includes sale content advertisement unit 221, an advertisement administration unit 222, a P2P application driving unit 223, and a P2P communication unit 224.

When the personal homepage administration part 230 requests a registration of sale content, the sale content advertisement unit 221 generates and publishes the sale content advertisement by attaching a product code, a URL of a product review page, and writer information, on the P2P network 81.

The advertisement administration unit 222 makes one of a product sale list including product codes advertised to the plurality of shopping mall servers 11 to 1N by collecting and analyzing product code advertisements after searching the P2P network 81 and a price list including a URL and price information of a product sale page in which own sale contents are used for sale information by collecting and analyzing price advertisements, under the control of the P2P application driving unit 223. Also, to support a shopping operation of a P2P application, the advertisement administration unit 222 may make a sale information list including a product review for a certain product, a URL of a product sale page, and price information by collecting and analyzing all sale content advertisements and price advertisements for the certain product.

The P2P application driving unit 223 installs the P2P application and controls operations of the advertisement administration unit 221 according to a request of a user of the user terminal 21. Also, the P2P application driving unit 223 displays one of a product sale list, a price list, and a sale information list obtained according to a result of control, on a user interface to allow the user to perform one of sale content advertisement operation and the shopping operation using the P2P application.

The P2P communication unit 224 interfaces all messages and data transmitted between the P2P application part 220 and the P2P network 81.

The personal homepage administration part 230 registers a product review for a certain product written in a personal homepage provided by the plurality of web portal servers 61 to 6K, as sale content. Also, the personal homepage administration part 230 may determine whether to attach a URL and price information of a product sale page provided by a shopping mall server using own sale content as sale information and attach the URL and price information of the product review page to a bottom of a product review page, as shown in B of FIG. 11.

Also, the personal homepage administration part 230 registers the product review of a product. The personal homepage administration part 230 let the user who created the product review store them in the user terminal and share it to the P2P network 81 or upload them to a web portal server and link them with URL.

The Internet communication part 240 interfaces data transmitted and received between the personal homepage administration part 230 and the Internet network 82.

Figure 4:
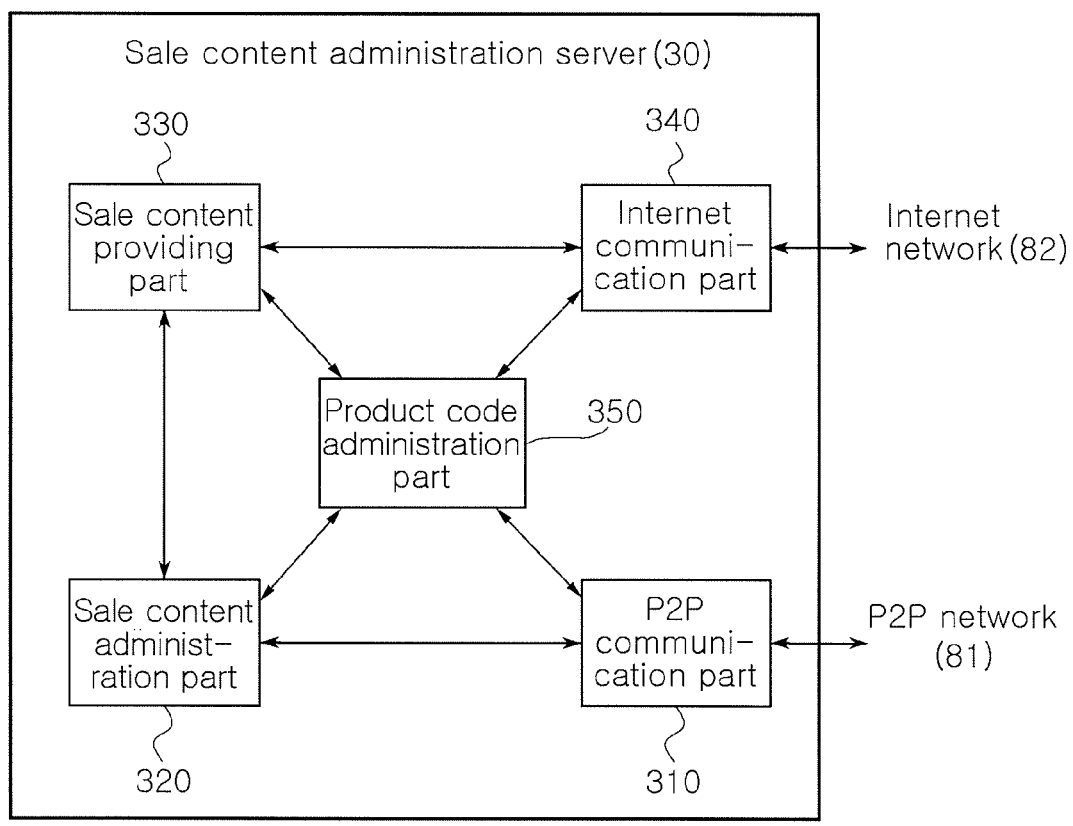
FIG. 4 is a detailed configuration diagram illustrating sale content administration server an exemplary embodiment of the present invention.

FIG. 4 is a detailed configuration diagram illustrating the sale content administration server 30 according to an exemplary embodiment of the present invention.

As shown in FIG. 4, the sale content administration server 30 includes a P2P communication part 310, a sale content administration part 320, a sale content providing part 330, an Internet communication part 340, and a product code administration part 350.

The P2P communication part 310 interfaces all messages and data transmitted and received between the sale content administration part 320, the product code administration part 350, and the P2P network 81.

The sale content administration part 320 collects and analyzes all sale content advertisements published by the P2P network 81 by searching the P2P network 81, extracts sale contents, and classifies the sale contents for each product.

When the shopping mall server 11 accesses via the Internet network 82 and requests sale content for a certain product, the sale content providing part 330 obtains and provides the sale contents corresponding to the certain product to the shopping mall server 11 by searching the sale content administration part 320.

The Internet communication part 340 interfaces data transmitted and received between the sale content providing part 330 and the Internet network 82.

When the plurality of shopping mall servers 11 to 1N register a new product in the sale content administration server 30 and receives a product code, the product code administration part 350 generates and publishes product code advertisements on the P2P network 81.

Figure 5:
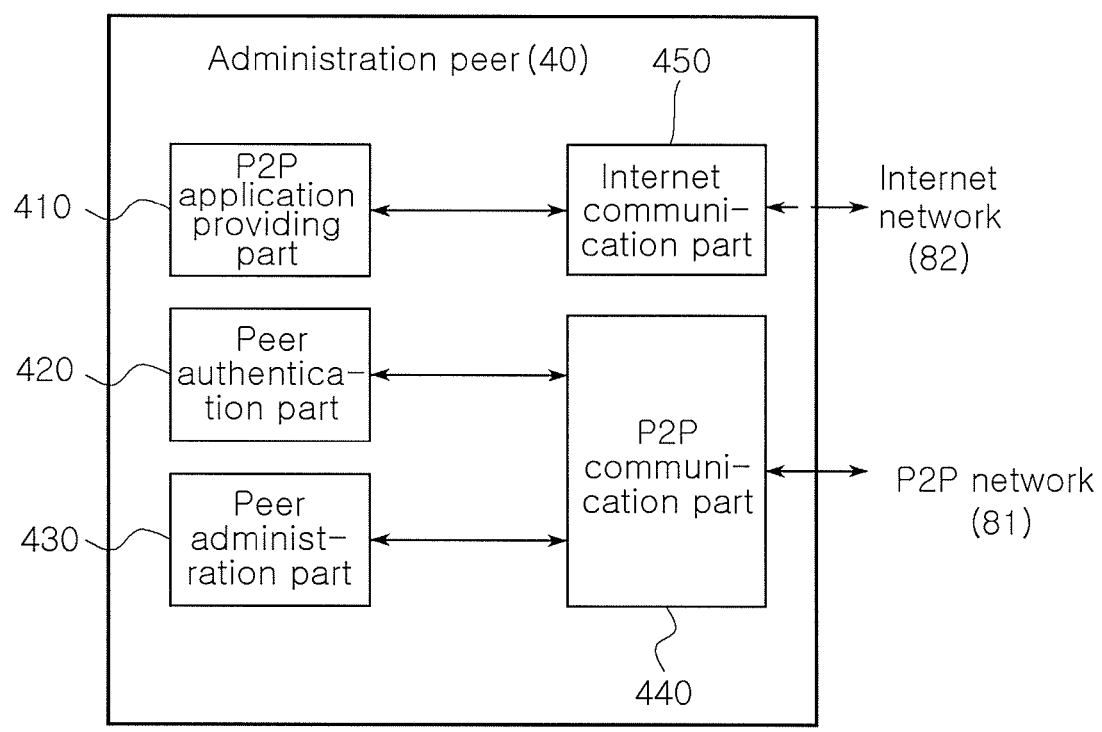
FIG. 5 is a detailed configuration diagram illustrating an administration peer an exemplary embodiment of the present invention.

FIG. 5 is a detailed configuration diagram illustrating the administration peer 40 according to an exemplary embodiment of the present invention.

As shown in FIG. 5, the administration peer 40 includes a P2P application providing part 410, a peer authentication part 420, a peer administration part 430, and a P2P communication part 440, and an Internet communication part 450.

The P2P application providing part 410 includes a P2P application and distributes the P2P application to the plurality of user terminals 21 to 2M requiring the P2P application.

The peer authentication part 420 includes login information of users authorized to use the P2P application. When the user terminal 21 drives a P2P program and inputs login information, the peer authentication part 420 performs an authentication operation and determines whether to activate the P2P application according to a result of the authentication operation.

The peer administration part 430 allows information of the user terminals 21 to 2M whose P2P application is activated, to be shared therebetween.

The P2P communication part 440 interfaces messages and data transmitted and received between the P2P application providing part 410, the peer authentication part 420, the peer administration part 430, and the plurality of user terminals 21 to 2M.

The Internet communication part 450 allows the users to download P2P application and to register themselves to the system.

Though the sale content administration server 30 is separated from the administration peer 40 in the above embodiment, if need be, the administration peer 40 may include the elements shown in FIG. 4 and may perform not only authentication services but also a sale content providing operation of the sale content administration server 30.

Figure 6:
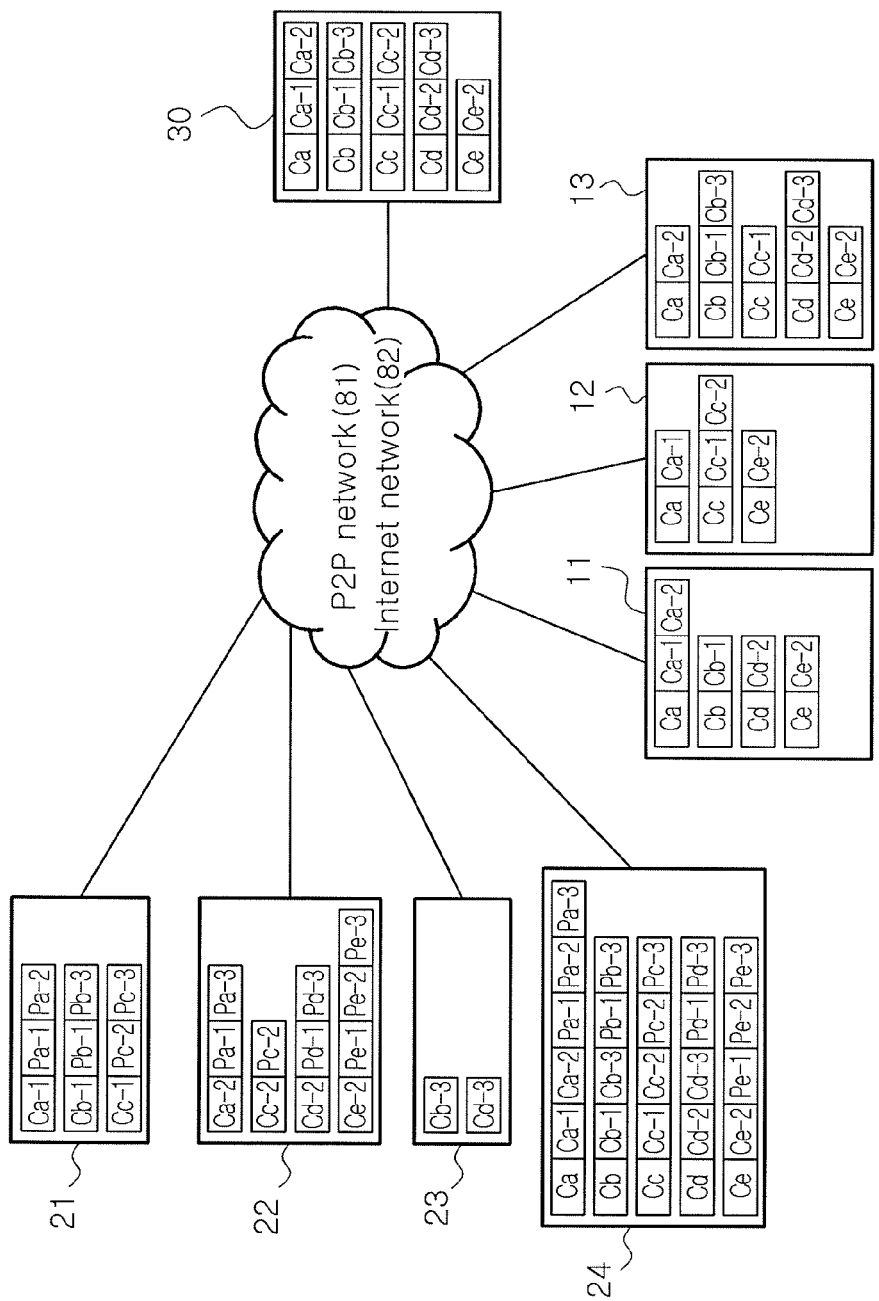
FIG. 6 is a diagram illustrating a plurality of user terminals and shopping mall servers to describe advertisement and collection methods thereof, according to an exemplary embodiment of the present invention.

FIG. 6 is a diagram illustrating the plurality of user terminals 21 to 24 and the shopping mall servers 11 to 13 to describe advertisement and collection methods thereof, according to an exemplary embodiment of the present invention.

In FIG. 6, Cx-y indicates a URL of a yth product review page including a product review for a Cx product and Px-z indicates a price of the Cx product in a zth shopping mall server, respectively.

When the first user terminal 21 advertises sale contents including product reviews Ca-1, Cb-1, and Cc-1, a second user terminal 21 advertises sale contents including product reviews Ca-2, Cc-2, Cd-2, and Ce-2, a third user terminal 23 includes sale contents including product reviews Cb-3 and Cd-3, respectively, the sale content administration server 30 stores sale contents for each product by searching and collecting all sale contents.

Then, each of the first to third shopping mall servers 11 to 13 collects the sale contents itself via the sale content P2P administration unit 122 or receives the sale contents for each product from the sale content administration server 30 to use as own sale information. For example, the first shopping mall server 11 may use the product reviews Ca-1 and Ca-2 as sale information for the Ca product.

Also, the respective shopping mall servers 11, 12, and 13 publishes price advertisements with respect to the user terminals 21, 22, and 23 advertising the sale contents used as the sale information, and the corresponding user terminals 21, 22, and 23 determines whether to show a URL and price information of an Internet shopping mall selling a corresponding product in a personal homepage. For example, price information Pa-1 and Pa-2 of the first and second shopping mall servers 11 and 12 may be shown in the product review of the Ca-1 as the first user terminal 21 or may not shown as the second user terminal 23.

Then, consumers may determine whether to buy a product after accessing the first shopping mall server 11 or the personal homepage via the Internet network 82 and reading product reviews of the product.

Also, as a fourth user terminal 24, a certain product may be bought after collecting product reviews and price information of all products by using the P2P application. A shopping operation may be performed by using the P2P application.

Figure 7A:
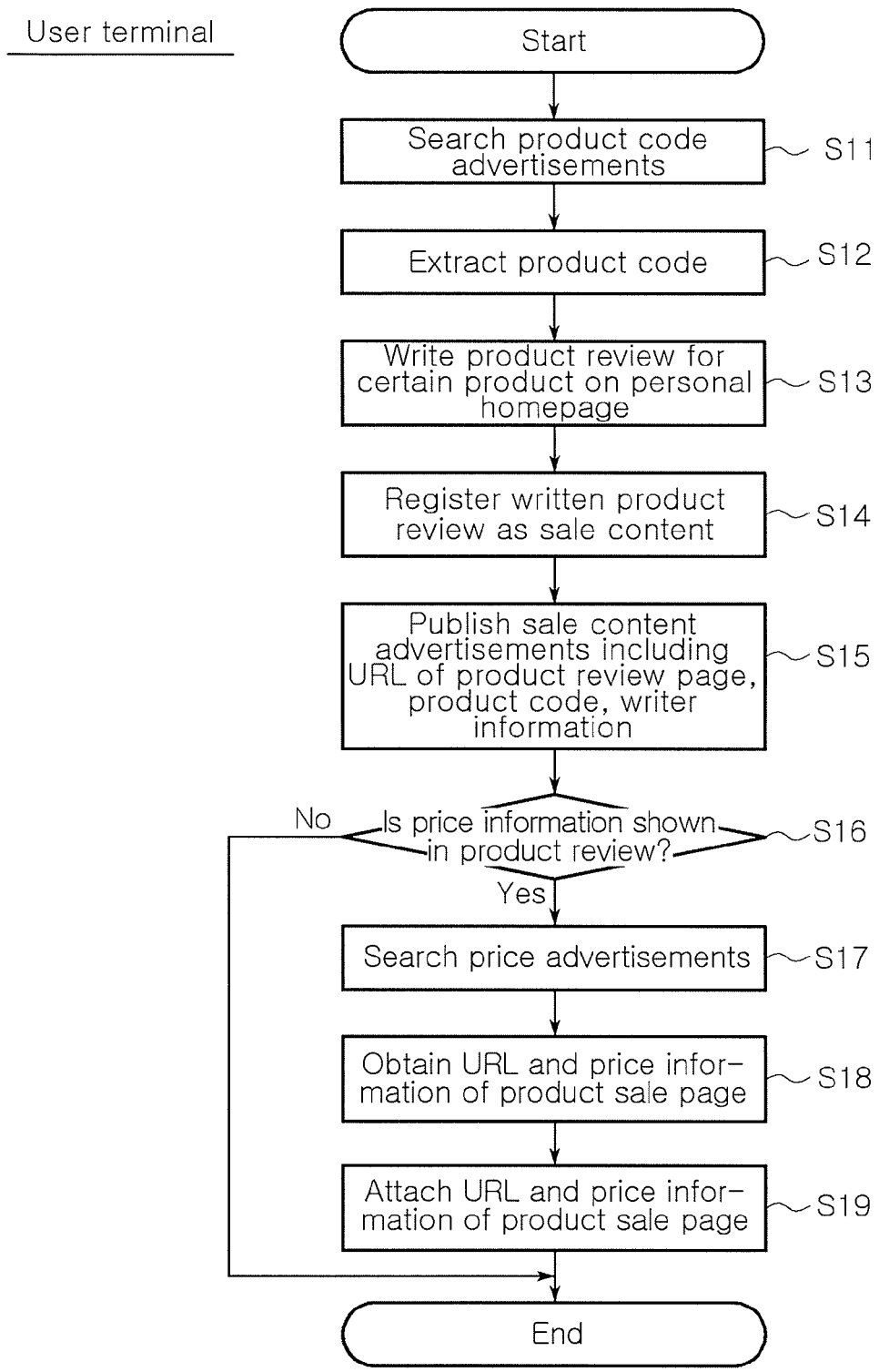
FIG. 7A is a flowchart illustrating a process of advertising sale content of a user terminal, according to an exemplary embodiment of the present invention.
Figure 7B:
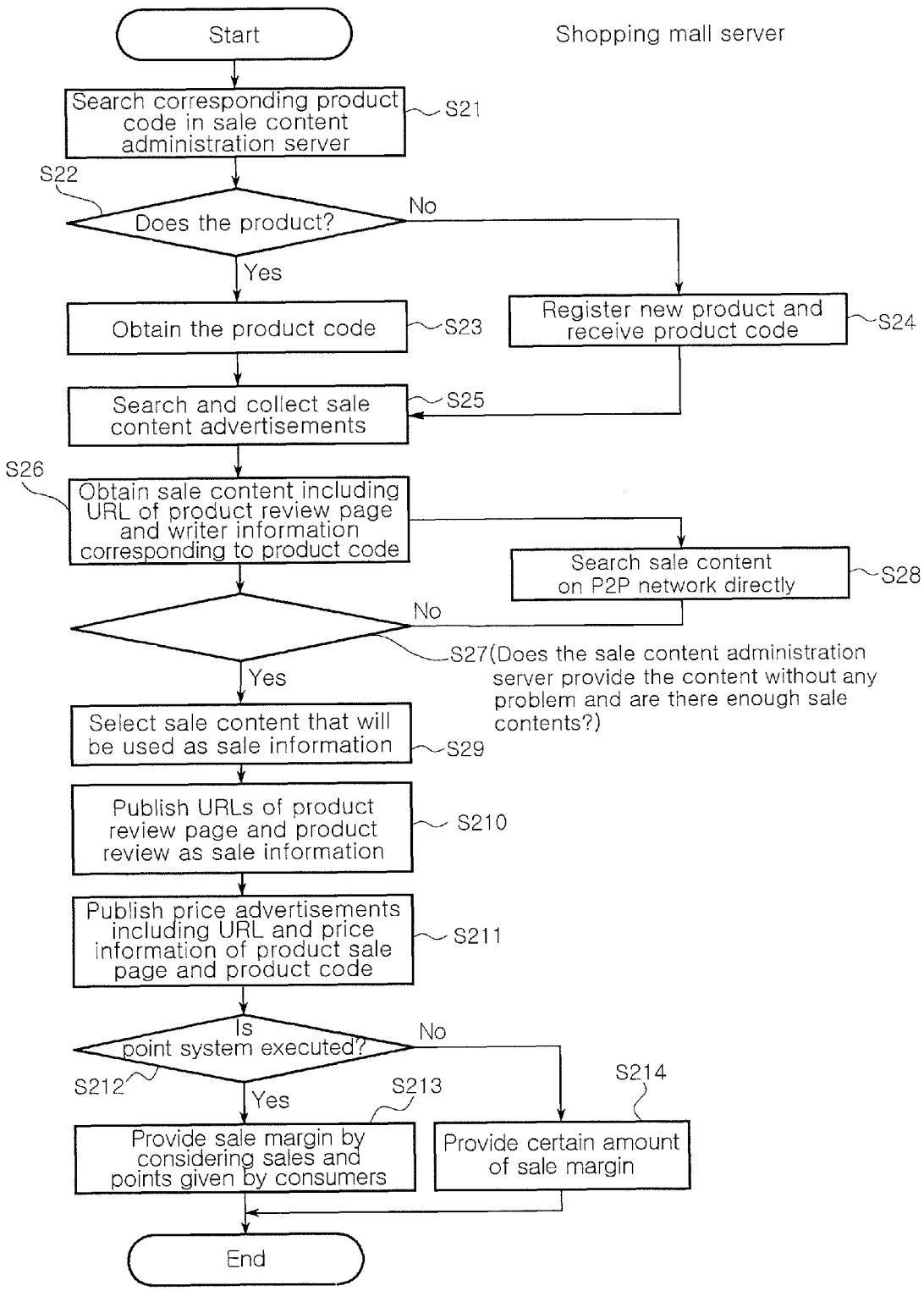
FIG. 7B is a flowchart illustrating a process of advertising a product and a price and registering sale content in a shopping mall server, according to an exemplary embodiment of the present invention.

FIGS. 7A and 7B are flowcharts illustrating sale content advertisement and registration operations according to an exemplary embodiment of the present invention. FIG. 7A is a flowchart illustrating operations of the user terminal 21, and FIG. 7B is a flowchart illustrating operations of the shopping mall server 11.

Referring to FIG. 7A, a process of a sale content advertisement of the user terminal 21 will be described.

The user terminal 21 searches product code advertisements published by the sale content administration server 30 via the P2P network in operation S11 and extracts a product code of a product to generate a product list in operation S12.

A user of the user terminal 21 accesses a personal homepage provided by the web portal servers 61 to 6K and writes a product review for a certain product as shown in A of FIG. 11 in operation S13 and register the written product review as sale content after selecting a product code of the product in operation S14.

In this case, when the product code of the product is not stored yet in the user terminal 21, the user may obtain the product code by directly connecting the sale content administration server 30.

The user terminal 21 generates and publishes the sale content advertisement including a URL of a product review page in which a product review is written, the product code, and writer information on the P2P network 81 in operation S15.

When the user want a URL and price information of a product sale page using own sale content as sale information to be shown on the product review page in operation S16, price advertisements corresponding to the product are searched and analyzed by using a P2P application in operation S17, the URL and price information of the product sale page are obtained in operation S18, and the URL and the price information of the product sale page of a shopping mall server are attached to the product review as shown in B of FIG. 11 in operation S19.

Referring to FIG. 7B, processes of product and price advertisements and sale content registration of the shopping mall server 11 will be described.

When there is a new product for sale, the shopping mall server 11 accesses the sale content administration server 30 and searches a product code for the new product in operation S21.

When the product code exists as a result of search in operation S22, the product code is obtained in operation S23.

When the product does not exist, the product is registered in the sale content administration server 30 and a product code of the product is issued in operation S24.

The shopping mall server 11 search and collects and analyzes sale content advertisements corresponding to an existing product by searching the P2P network 81 in operation S25 and extracts sale content including a URL and writer information of a product review page corresponding to the product code in operation S26.

When the sale content administration server provide the content properly without any problem such as traffic problem and the selected sale contents are enough to be used as sale information on the shopping mall in operation S27, an administrator of the shopping mall server 11 selects sale content that will be used for sale information in operation S29, selects one of linking the URL of the product review page and directly publishing a product review written in the product review page, and publishes selected information on a product sale page in operation S210.

When the sale content administration server has any problem or the selected sale contents are not enough to be used as sale information on the shopping mall in operation S27, the administrator of the shopping server 11 searches more sale content on the P2P network directly in operation S28.

When the selected information is successively published on the product sale page selling the product, the shopping mall server 11 publishes price advertisements including price information of the product, a URL of the product review page and the product code on the P2P network 81 in operation S211.

The administrator of the shopping mall server 11 determines whether to execute a point system with respect to the sale content.

When the point system is determined to be executed in operation S212, a sale margin is provided by considering sales of the product and points given to the sale content by consumers in operation S213. When the point system is determined not to be executed, a certain amount of a sale margin is provided regardless of point in operation S214.

Figure 8A:
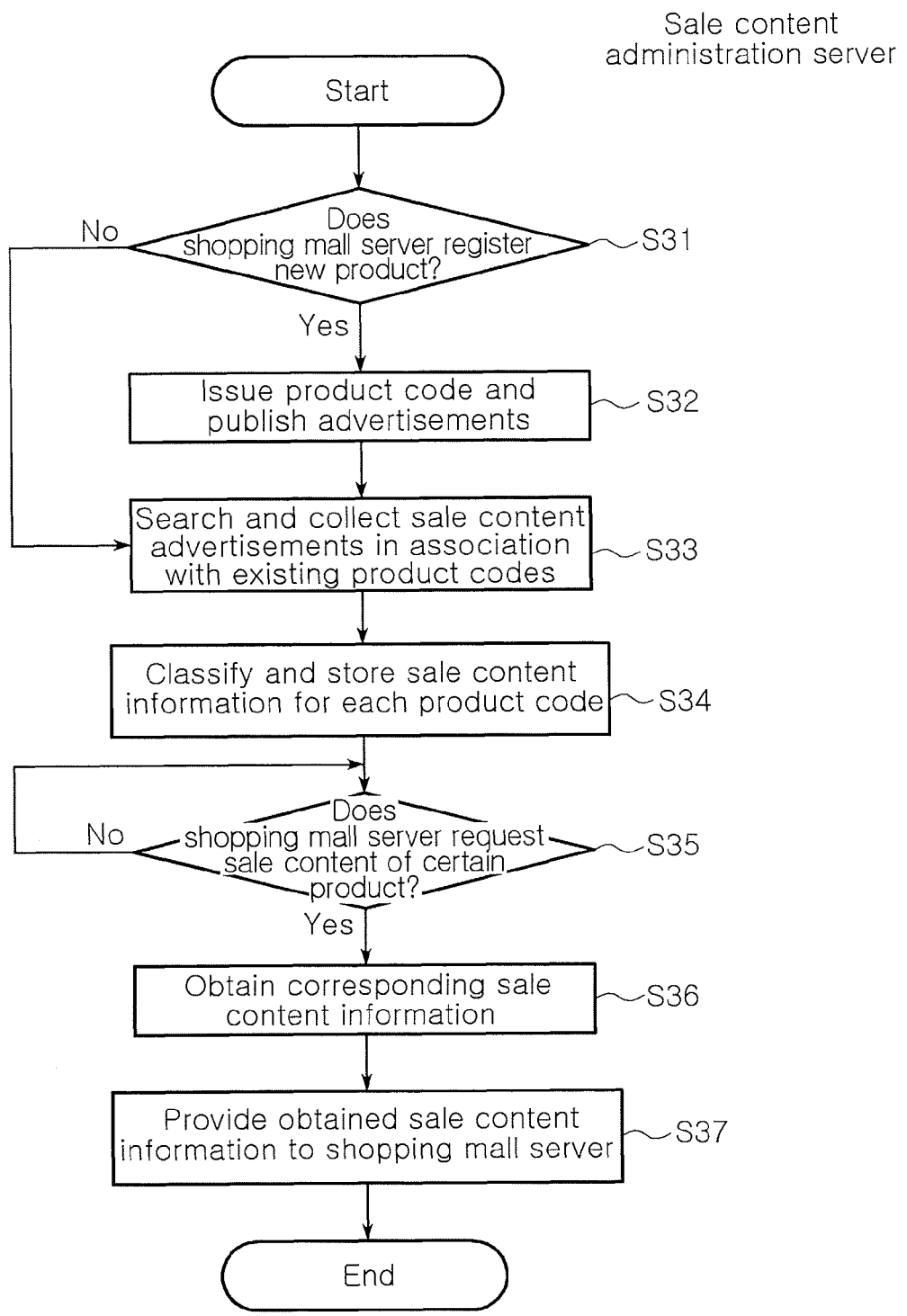
FIG. 8A is a flowchart illustrating a process of collecting and providing sale content in sale content administration server, according to an exemplary embodiment of the present invention.
Figure 8B:
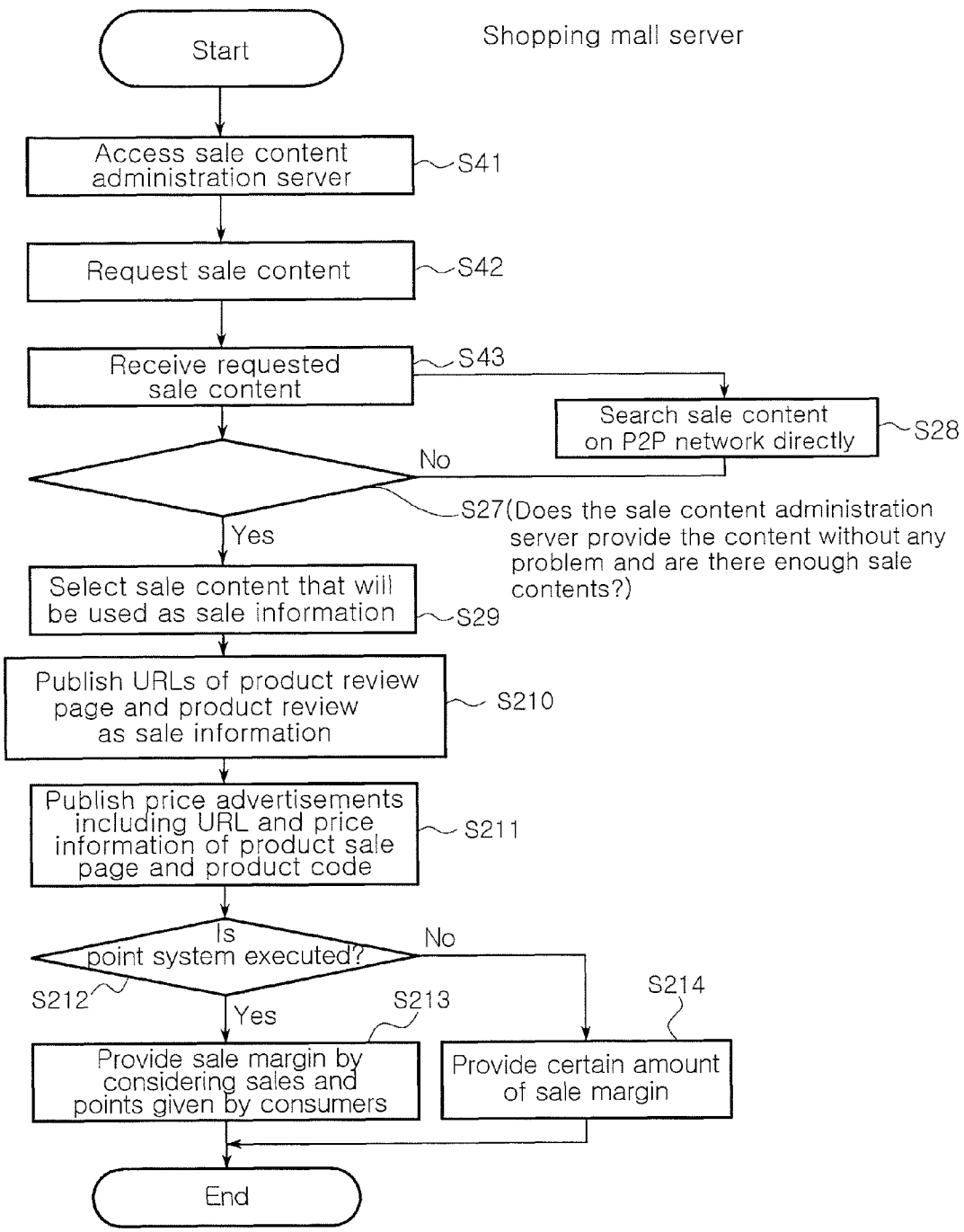
FIG. 8B is a flowchart illustrating a process of advertising a product and a price and registering sale content in a shopping mall server, according to an exemplary embodiment of the present invention.

FIGS. 8A and 8B are flowcharts illustrating operations of sale content advertisement and registration according to another embodiment of the present invention. FIG. 8A is a flowchart illustrating operations of the sale content administration server 30, and FIG. 8B is a flowchart illustrating operations of a shopping mall server.

Referring to FIG. 8A, processes of product code administration and collecting and providing sale content in the sale content administration server 30 will be described.

When the plurality of shopping mall servers 11 register new products, respectively, in operation S31, the sale content administration server 30 issues a product code for the new product and publishes a product code advertisement for advertising the product code on the P2P network 81 in operation S32.

The sale content administration server 30 periodically searches the P2P network 81 and collects sale content advertisements published by the plurality of user terminals 21 to 2M with respect to products with a product code in operation S33 and classifies and stores sale content information for each product code in operation S34.

In this case, when the shopping mall server 11 access via the Internet network 82 and requests sale content for a certain product code in operation S35, the sale content administration server 30 obtains all corresponding sale contents information in operation S36 and provides the sale contents information to the shopping mall server 11 in operation S37.

Referring to FIG. 8B, processes of product and price advertisements and sale content administration of the shopping mall server 11 accesses the sale content administration server 30 via the Internet network 82 in operation S41 and requests sale content for a product code in operation S42.

When the sale content administration server 30 provides the sale content, the shopping mall server 11 receives the sale content in operation S43, selects the sale content in operation S29 of FIG. 7B and publishes the sale content on the product sale page to use as sale information.

Since following operations after S29 are identical with FIG. 7B, the description will be omitted.

Figure 9:
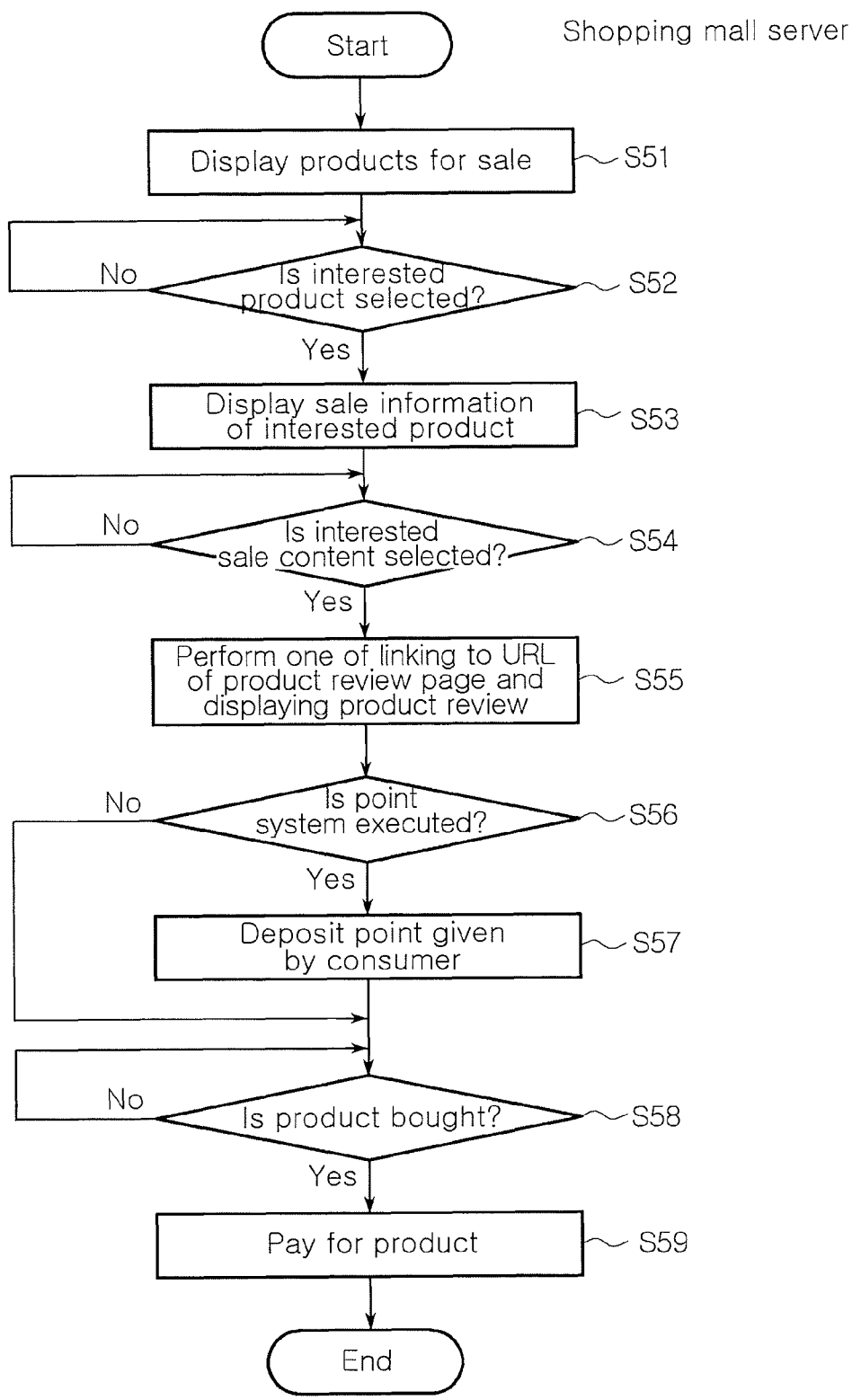
FIG. 9 is a flowchart illustrating a sale operation of a shopping mall server, according to an exemplary embodiment of the present invention.

FIG. 9 is a flowchart illustrating sale operations of the shopping mall server 11.

The shopping mall server 11 displays products for sale via an Internet shopping mall in operation S51.

When a consumer accessing the Internet shopping mall selects an interested product in operation S52, sale information of the product is displayed in operation S53. In this case, one of a URL of a product review page including sale content and a product review list of the sale content is also published together with a product description, price information, and product review written by consumers.

When the consumer selects certain sale content in operation S54, one of linking to the URL of the product review page and directly displaying a product review of the sale content is performed in operation S55.

After checking whether a point system is executed with respect to the selected sale content in operation S56, when the sale content corresponds to the point system, the consumer is allowed to give a point and the point given by the consumer is deposited in operation S57.

When the consumer determines to buy in operation S58, the user pays for the product via a payment system to buy the product in operation S59.

Figure 10:
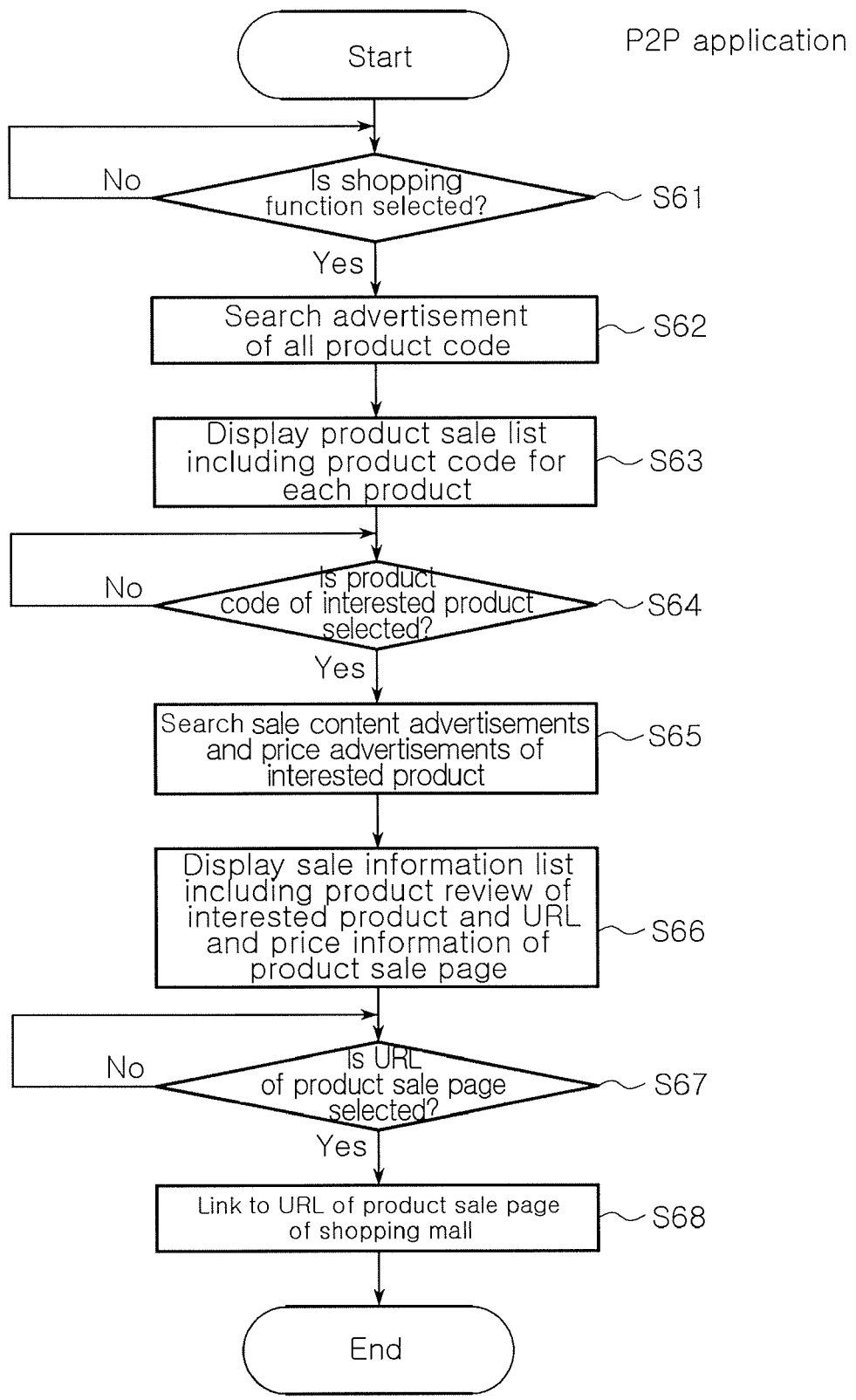
FIG. 10 is a flowchart illustrating a sale operation using a P2P application, according to an exemplary embodiment of the present invention.

FIG. 10 is a flowchart illustrating sale operations using a P2P application.

When a user of the user terminal 21 activates the P2P application and selects a shopping function in operation S61, the user terminal 21 searches and analyzes all product code advertisements by searching the P2P network 81 in operation S62, extracts product codes and generates and displays a product sale list including a product code for each product on a user interface of the P2P application in operation S63.

When the user selects a product code of an interested product in operation S64, the user terminal 21 searches sale content advertisements and price advertisements for the interested product by searching the P2P network 81 in operation S65. A sale information list including a product review for the interested product and a URL and price information of a product sale page is generated by analyzing the sale content advertisement and price advertisements and displayed on the user interface of the P2P application in operation S66.

When the user selects the URL of the product sale page in operation S67, the interested product may be bought in a corresponding shopping mall by linking the URL of the product sale page in operation S68.

In FIG. 10, if need be, as shown in FIG. 7B, the point system with respect to the sale content may be executed to allow the user to give a point to the sale content.

The method and apparatus for Internet sale using sale contents may allow consumers to know more detailed descriptions and opinions and may appreciate and protect a product review written in a personal homepage as sale content to generate a profit thereof.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of advertising sale content in a user terminal comprising the steps of:
    searching, via a P2P network, product code advertisements which include product codes, and which are published on the P2P network by shopping mall servers so that user terminals can search the product codes;
    collecting and analyzing a product code advertisement, obtaining the product code from the product code advertisement, and storing the product code, the product code being associated with a product;
    writing a product review for the product code in a personal homepage; and
    generating a sale content advertisement including the product review and the product code for which the product review was written;
    publishing the sale content advertisement including the product review and the product code for which the product review was written on the P2P network such that any one or more of a plurality of shopping mall servers can obtain the product review.

2. The method of claim 1, wherein collecting and analyzing a product code advertisement includes the steps of:
    collecting a plurality of product code advertisements by searching the P2P network; and
    extracting the product codes from the product code advertisements and creating and storing a product sale list including the product codes.

3. The method of claim 2, wherein the publishing sale content advertisement includes the steps of:
    writing the product review of the product in the personal homepage; and
    selecting one of the product codes for the product for which the product review was written to register the product review as the sale content.

4. The method of claim 1, wherein the publishing a sale content advertisement includes the steps of:
    generating the sale content advertisement including a uniform resource locator of the personal homepage, the product code, and writer information; and
    publishing the sale content advertisement on the P2P network.

5. The method of claim 1, further comprising the steps of:
    collecting price advertisements, which correspond to the sale content advertisement, from the P2P network, and analyzing the price advertisements to obtain a uniform resource locator of a server for a shopping mall selling the product having the product code and obtaining price information of the shopping mall; and
    attaching the uniform resource locator and the price information of the shopping mall to the product review in the product review page.

6. The method of claim 5, wherein the collecting and analyzing price advertisements includes the steps of:
    searching the P2P network and collecting the price advertisements corresponding to the sale content advertisement; and
    obtaining and storing the uniform resource locator and the price information of the shopping mall by analyzing the price advertisements.

7. The method of claim 4, wherein the uniform resource locator of the personal homepage is a uniform resource locator of a product review page including the product review.

8. The method of claim 5, wherein the uniform resource locator of the shopping mall server is a uniform resource locator of a product sale page for selling the product.

9. The method of claim 1, wherein the product review is configured as one of text, photograph and a user created movie clip.

10. A user terminal comprising: a data processing apparatus comprising a processor and a memory wherein the data processing apparatus is configured to:
    search, via a P2P network, product code advertisements which include product codes, and which are published on the P2P network by shopping mall servers so that user terminals can search the product codes;
    collect and analyze a product code advertisement, obtaining the product code from the product code advertisement, and storing the product code, the product code being associated with a product;

write a product review for the product code in a personal homepage;

generate a sale content advertisement including the product review and the product code for which the product review was written; and publish the sale content advertisement including the product review and the product code for which the product review was written on the P2P network such that any one or more of a plurality of shopping mall servers can obtain the product review.

11. The terminal of claim 10, wherein the data processing apparatus is configured to collect and store price advertisements corresponding to the sale content advertisement.

12. The terminal of claim 10, wherein the data processing apparatus is configured to determine whether to add the price advertisements to the product review.

13. The terminal of claim 10, wherein the data processing apparatus is configured to store the product review of a product in the user terminal and share them to the P2P network.

14. The terminal of claim 10, wherein the data processing apparatus is configured to:

store the product code by collecting and analyzing the product code advertisements and a uniform resource locator of the personal homepage;

store the price information of the shopping mall;

store the sale content advertisement, by collecting and analyzing the price advertisements, wherein the sale content advertisement includes the product review, the product code, the uniform resource locator of the personal homepage and writer information on the P2P network, to display one of the product code, the uniform resource locator, and the price information of the shopping mall.

15. The terminal of claim 14, wherein the data processing apparatus is configured to display the product review, the uniform resource locator and the price information of the shopping mall, when the displayed product code is selected.

16. The terminal of claim 14, wherein the uniform resource locator of the personal homepage is a uniform resource locator of a product review page in which the product review is written, and the uniform resource locator of the shopping mall server is a uniform resource locator of a product review page for selling the product.

17. A method of advertising sale content in a user terminal connected to a super peer to access a P2P network comprising the steps of:

receiving, by the user terminal from an administration peer, a P2P application and performing a user authentication with the administration peer;

searching, via a P2P network by the user terminal connected to the super peer, product code advertisements which include product codes, and which are published on the P2P network so that user terminals can search the product codes;

collecting and analyzing by the user terminal connected to the super peer a product code advertisement, obtaining by the user terminal connected to the super peer the product code from the product code advertisement, and storing by the user terminal connected to the super peer the product code, the product code being associated with a product;

writing, by the user terminal connected to the super peer, a product review for the product code in a personal homepage;

generating, by the user terminal connected to the super peer, a sale content advertisement including the product review and the product code for which the product review was written; and publishing, by the user terminal connected to the super peer, the sale content advertisement including the product review and the product code for which the product review was written on the P2P network such that any one or more of a plurality of shopping mall servers can obtain the product review.

* * * * *